United States Patent
Kohl

[11] 3,815,384
[45] June 11, 1974

[54] COUPLING FRAME FOR THE PIPE FRAME FOR WARP BEAM BEARINGS

[76] Inventor: Karl Kohl, 10 Chlorodont Strasse, Obertshausen, Germany 6053

[22] Filed: Sept. 22, 1972

[21] Appl. No.: 291,493

[52] U.S. Cl. .............................................. 66/86 A
[51] Int. Cl. .............................................. D04b 27/16
[58] Field of Search ............... 66/86 A, 86 R, 87; 139/1 R, 97, 101, 103, 104; 28/42, 32, 1 R; 242/129.6

[56] References Cited
UNITED STATES PATENTS
| | | | |
|---|---|---|---|
| 1,509,717 | 9/1924 | Davis | 242/129.6 |
| 1,940,165 | 12/1933 | Garretson | 242/129.6 |
| 2,489,557 | 11/1949 | Blanchard | 139/1 R |
| 2,604,768 | 7/1952 | Schuster | 66/86 R |
| 3,069,110 | 12/1962 | Domer | 242/129.6 |

FOREIGN PATENTS OR APPLICATIONS
| | | | |
|---|---|---|---|
| 447,924 | 5/1948 | Italy | 139/97 |
| 4,963 | 0/1888 | Great Britain | 66/86 A |
| 130,133 | 1/1929 | Switzerland | 66/86 A |
| 62,300 | 5/1944 | Denmark | 139/104 |
| 416,511 | 11/1946 | Italy | 139/103 |

Primary Examiner—James Kee Chi
Attorney, Agent, or Firm—Omri M. Behr, Esq.

[57] ABSTRACT

The invention concerns a coupling sleeve for a sturdy support structure constructed of tubes for an adjustable frame for the bearings of the Warp beams of a Warp knitting machine.

3 Claims, 7 Drawing Figures

700
COUPLING FRAME FOR THE PIPE FRAME FOR WARP BEAM BEARINGS

FIELD OF THE INVENTION

Warp Beam Bearings

DESCRIPTION OF THE PRIOR ART

In the Warp knitting machines of the prior art, the Warp beams are supported on either side of the upper portion of the machine with a supporting structure constructed of a single or a split casting, thus the machine is locked into a particular structural form for a single and specific design.

Since in the method of practicing Warp knitting many different configurations of the Warp beams are possible, it is necessary to have available as many as 50 different types of superstructures. This needless to say, requires an enormous expenditure in terms of construction, fabrication, transportation and storage space. In addition to these problems, it should be noted that the castings are subjected to a considerable vibration factor and therefore are liable to fracture. Furthermore, the two upper portions located on each side of the machine must, despite their comparaively high rigidity be further supported.

It has been attempted, in the past, to provide a variation in the arrangement and size of the beams utilized by the provision of different bearing locations. This mode of operation however, hardly has a positive influence on the cost involved. A further suggestion, namely to weld the upper parts together with steel plate, has not been successful.

It is known to construct support means for the Warp beams of a Warp knitting machine using tube components wherein the tube components are provided with splicing sleeves. These splicing sleeves however merely serve as connecting parts for the frame on the pipes of which the Warp beam bearings are attached.

Thus the drive shaft for the Warp beam does not pass through the connecting sleeves.

SUMMARY OF THE INVENTION

In the structure of the present invention the problems described hereinabove are solved, the frame is simplified, and the work involved in changing the beams is also simplified. In the structure of the present invention the sleeve links for the frame work are utilized as the bearing housings for the Warp beam shaft. In another modification, the sleeve is split so that the sleeve acts as a hinge about which the clamping portions of the sleeve may mutually rotate. Thus the sleeve acts not only as a Warp beam bearing, but also as a hinge. In this second modification by utilizing the sleeve as a hinge which is also provided with beam bearing means, a saving in the expenditure involved in providing connecting sleeves for different frame forms is made possible.

In accordance with the novel structure of the present invention which utilizes the connecting sleeve as a bearing housing, the bearing forces are lead through the junction points in the tubing into the frame.

BRIEF DESCRIPTION OF THE DRAWINGS

The invention is diagramatically illustrated, by way of example, in the drawings appended thereto, in which.

DESCRIPTION OF THE PREFERRED EMBODIMENTS

Figure 1:
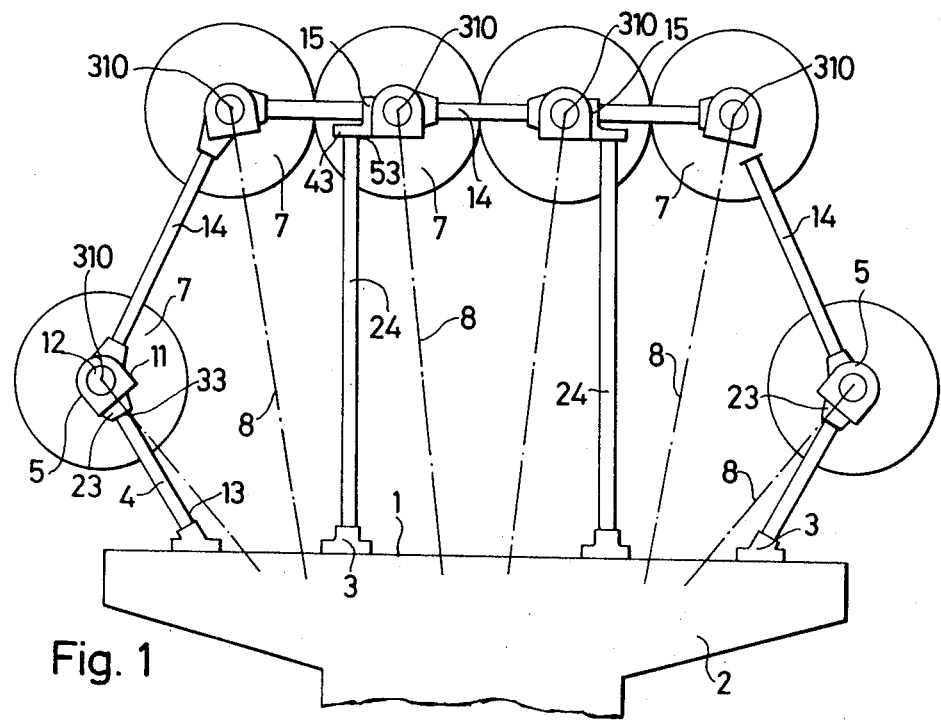
FIG. 1 is a schematic side elevational view of the upper portion of a machine of the present invention showing the connecting sleeves.

On the upper surface of the twin-sided machine carriage 2 are located a plurality of clamps 3. Support tubes 4 are clampably connected into openings 13 in clamps 3. The connecting sleeves 5 comprise a housing 11 having an annular opening 12 therein and clamping means 23 having opening 33 therein, attached to housing 11. It is generally preferred to have a pair of clamping means 23, one located on either side of housing 11. Connecting tube 4 is clamped into opening 33 of clamping means 23 thereby connecting sleeve 5 to clamping means 3. A plurality of connecting sleeves 5, (and similar sleeves 15 and 25) are connected to provide the framework of the system of the present invention. Depending on the number of warp beams utilized and their weight, it is often desirable to provide additional support to connecting sleeves 5. Certain of these supported connecting sleeves are designated as 15 and bear thereupon an additional clamping means 43 having an opening 53 therein. Support bars 24 are received into such opening 53 at one end thereof and into additional base clamping means 3 on the upper surface 1 of the machine. The shafts 6 of warp beams 7 are received into openings 12 in connecting sleeves 5 whereby opening 12 serves to receive shafts 6 which is journalled on conventional bearings within the housing. Drive means — schematically indicated at 8 in FIG. 1 — for the shafts 6 of warp beams 7, may engage shafts 6 by conventional means, such as by the sprocket wheel 28 (FIG. 3) secured about shaft 6. Such drive means 8, may for example, comprise a drive chain engaging the said sprocket wheel 28.

Figure 2:
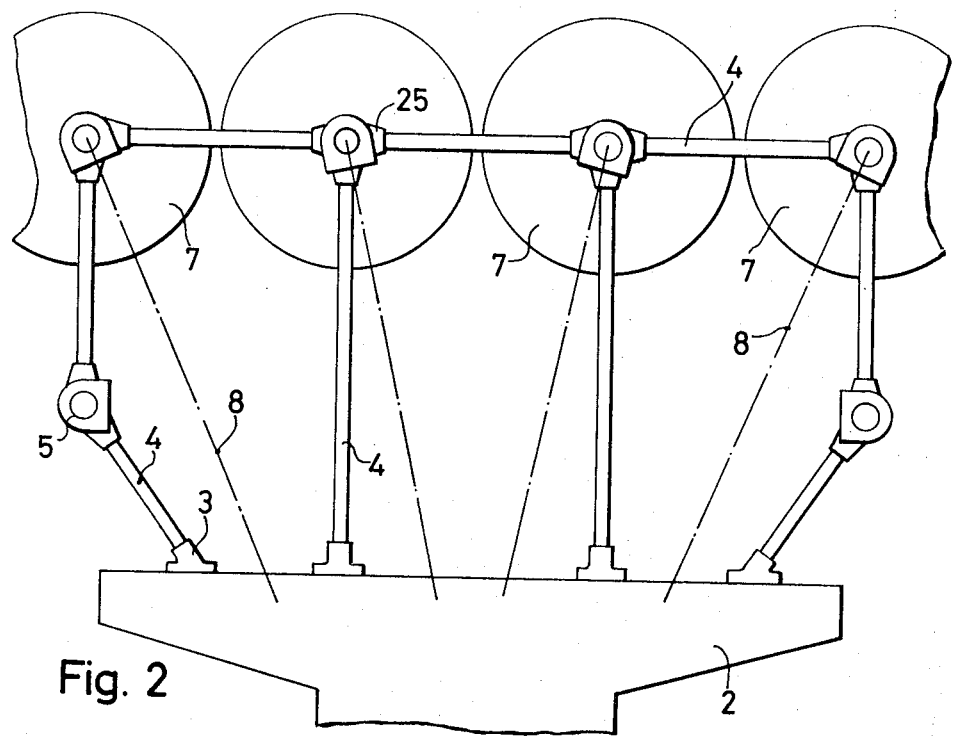
FIG. 2 is the upper portion of a different embodiment of the machine of FIG. 1 showing the utilization of Warp beams of greater diameter.

It will be clear to one skilled in the art that the arrangements basically set forth in FIG. 1 can be varied at will using different lengths of connecting pipes 4, 14 and 24 and different numbers of connecting sleeves 5, 15 and 25 in order to suit the requirements of the machine. One alternate mode is illustrated in FIG. 2.

Figure 3:
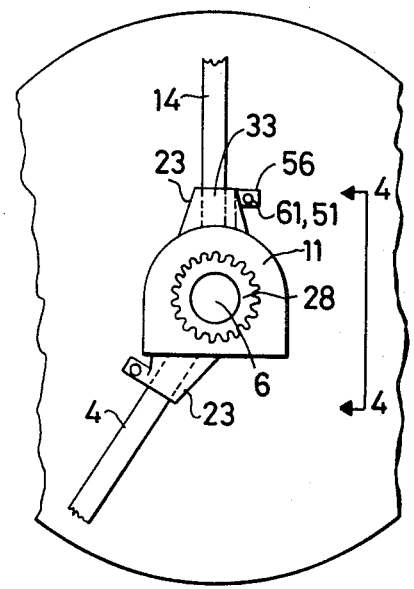
FIG. 3 is an enlarged plan view of one sleeve of FIG. 1.
Figure 4:
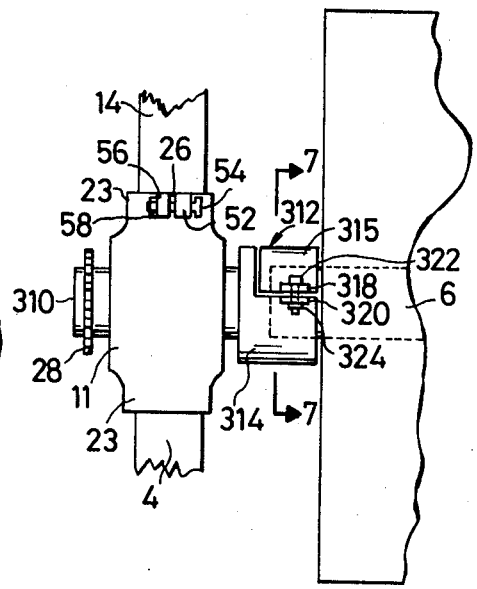
FIG. 4 is an elevational view of FIG. 3 viewed in the direction of line 4—4.

One embodiment of the housing having clamping means rigidly attached thereto is illustrated in FIGS. 3 and 4. The connecting sleeve 5 comprises the bearing housing 11 and, in this embodiment, two clamping portions 23 mutually oriented at predetermined angles to each other. The top portion of 23 is split at 26. On either side of split 26 are fixed to portion 23 clamping eyes 52 and 56, having openings 51 and 61 running therethrough. Bolt 54 is located through openings 51 and 61 and has attached to one end thereof, nut 58. By rotating bolt 54 relative to nut 58 clamping eyes 52 and 56 are drawn towards each other thus narrowing the internal diameter of clamping portion 23 sufficiently to rigidly retain tubing 14 (or 4 as the case may be) within opening 33.

Figure 5:
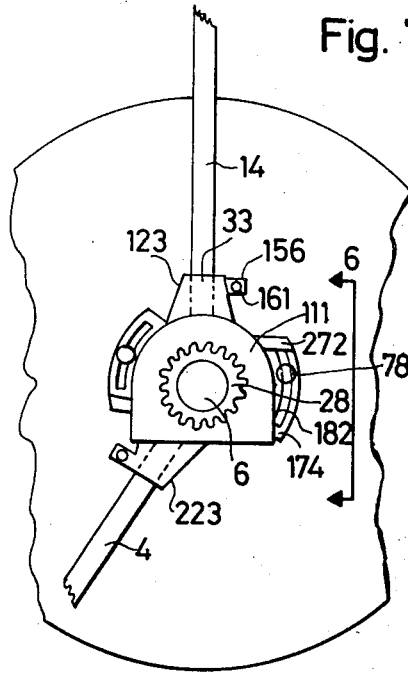
FIG. 5 is an enlarged plan view of the hinged modification of a sleeve of FIG. 1.
Figure 6:
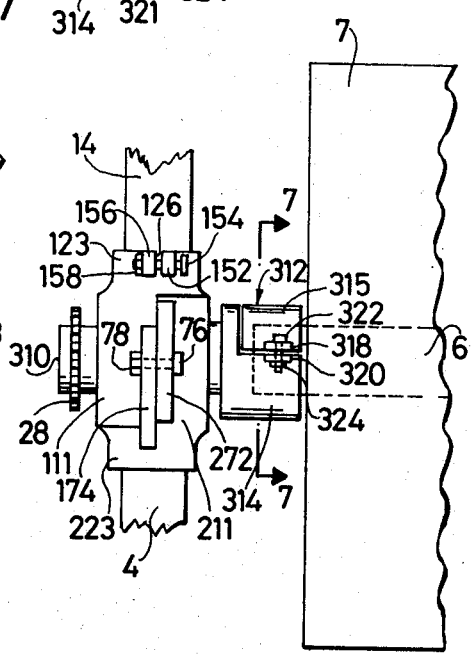
FIG. 6 is an elevational view of the sleeve of FIG. 5, taken in the direction of the line 6—6.

In a further embodiment of the invention the angular orientation of the clamping means 23 with respect to each other may be altered in order to accommodate a desired machine configuration. Upon achieving the desired configuration the relative angular orientation of the several clamping means may then be rigidly maintained. This embodiment of the invention is illustrated in FIGS. 5 and 6. As seen therein, the sleeve 5 is divided into two segments having substantially L-shaped sections relative to each other. The 2 segments have means attached thereto for maintaining a predetermined mutual angular orientation.

In this embodiment sleeve 5 comprises the bearing housing 111 having clamping means 123 integrally attached thereto. Clamping means 123 is split at 126. On either side of 126 are clamping eyes 152 and 156 having openings 51 and 61 therethrough. Bolt 154 passes through openings 51 and 61 and has nut 158 attached to the other end thereof. By rotating bolt 154 relative to nut 158 clamping eyes 152 and 156 are drawn towards each other thus narrowing the internal diameter of clamping portion 123 sufficiently to rigidly retain tubing 14 (or 4 as the case may be) within opening 33.

Attached to the outer circumference of housing 111 having a plane perpendicular to the axis of shaft 6, is clamping plate 174 having slot 182 in the plane thereof. It is within the purview of the present invention that there may be one or two such clamping plates on housing 11, two are illustrated in FIGS. 5 and 6.

The second portion of sleeve 5 is essentially the mirror image of the portion previously described herein and above. Namely it comprises the bearing housing 211 and the clamping means 223. Clamping means 223 is essentially identical in structure to clamping means 123, and is similarly actuated by means of a bolt which passes through openings formed at eyes of means 223 and engages with a cooperating nut in a manner already described for means 123. Plate 272 is attached to portion 211 in the same manner as 174 is attached to section 111, and has a slot 282 (not shown in drawing) therein. Bolt 76 passes through slots 282 (not shown in drawing) and 182 and has nut 78 attached to the other end thereof. By rotating bolt 76 relative to nut 78 plates 174 and 272 are clamped together thereby preventing mutual rotation of clamping portions 123 and 223 about their common axis.

In order to secure the two sectors of sleeve 5 more rigidly together, the two mutually impinging surfaces of 174 and 272 may be provided with a friction surface, for example, the surfaces may be serrated so that even under vibratory conditions there will be no slippage even if a slight loosening occurs between bolt 76 and nut 78.

It should be noted that since the beams in the machine should be readily removable without disassembly of the frame a suitable coupling and decoupling means should be provided. One modification of such means is shown in FIGS. 4, 6 and 7.

The beam axle 6 is separated from the axle 310 borne in the housing 11 and is connected thereto by coupling 312. The coupling comprises a semiannular shaped part 314 rigidly connected to axle 310 and an upper removable portion 312, which together encircle the end of axle 6. Portion 312 is rigidly affixable to axle portion 314, thus coupling axle 6 between portions 312 and 314. For this purpose clamping eyes 318 and 320 having eyes 319 and 321 respectively therein are affixed to portion 312 and 314 respectively. Bolt 322 passes thru eyes 319 and 321 and secured by nut 324.

Figure 7:
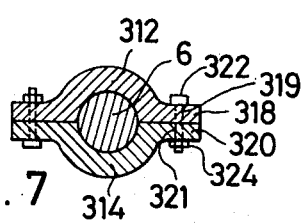
FIG. 7 is a partial sectional elevational view of FIGS. 4 and 6 viewed from 7—7.

As shown on FIG. 7 similar clamping means are affixed to the other side of 312 and 314.

I claim:

1. A coupling sleeve for the connecting tubes defining the framework which journalably supoorts the warp beams of a warp knitting machine, comprising: a bearing housing having an opening therein adopted to journal the rotating shaft of said warp beam; at least two clamping means at said housing lying in substantially the same plane, said plane being perpendicular to the axis of the said rotating shaft; said means having an opening therein for receiving said connecting tubes, the axis of at least two of said openings being perpendicular to, and intersecting with the axis of said rotating shaft; and means to constrict said openings to effect clamping of said received tubes.

2. Apparatus in accordance with claim 1 wherein said clamping means are integral with said housing.

3. A connecting sleeve according to claim 1 comprising a first clamping means rotatable about the axis of the shaft, a second clamping means rotatable about the axis of the shaft and a further clamping means to maintain said first clamping means in a predetermined angular relation to said second clamping means.

* * * * *

UNITED STATES PATENT OFFICE
CERTIFICATE OF CORRECTION

Patent No. 3,815,384    Dated June 11, 1974

Inventor(s) Karl Kohl

It is certified that error appears in the above-identified patent and that said Letters Patent are hereby corrected as shown below:

On the cover sheet insert

-- [30] Foreign Application Priority Data

Germany    P21 47 241.3    Sept. 9, 1971 --.

Signed and sealed this 1st day of October 1974.

(SEAL)
Attest:

McCOY M. GIBSON JR.              C. MARSHALL DANN
Attesting Officer                Commissioner of Patents

UNITED STATES PATENT OFFICE
CERTIFICATE OF CORRECTION

Patent No. 3,815,384  Dated June 11, 1974

Inventor(s) Karl Kohl

It is certified that error appears in the above-identified patent and that said Letters Patent are hereby corrected as shown below:

On the cover sheet insert:

-- [30] Foreign Application Priority Data

Germany  P21 47 241.3  Sept. 22, 1971 --.

This certificate supersedes Certificate of Correction issued Oct. 1, 1974.

Signed and sealed this 11th day of February 1975.

(SEAL)
Attest:

RUTH C. MASON
Attesting Officer

C. MARSHALL DANN
Commissioner of Patents
and Trademarks